United States Patent
Koiwa et al.

(10) Patent No.: US 10,144,305 B2
(45) Date of Patent: Dec. 4, 2018

(54) BATTERY CONTROL DEVICE, BATTERY SYSTEM, AND MOVABLE BODY

(71) Applicant: Kabushiki Kaisha Toshiba, Minato-ku (JP)

(72) Inventors: Kaoru Koiwa, Shibuya (JP); Hitoshi Nirasawa, Meguro (JP); Hideo Yamasaki, Shinagawa (JP); Takeshi Yasuda, Yokohama (JP); Hiroki Matsushita, Kawasaki (JP); Tomomi Kageyama, Shibuya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 212 days.

(21) Appl. No.: 15/194,905

(22) Filed: Jun. 28, 2016

(65) Prior Publication Data

US 2017/0158080 A1    Jun. 8, 2017

(30) Foreign Application Priority Data

Dec. 2, 2015 (JP) ................. 2015-235925

(51) Int. Cl.
*H02J 7/00* (2006.01)
*B60L 11/18* (2006.01)
(Continued)

(52) U.S. Cl.
CPC ......... *B60L 11/1868* (2013.01); *B60L 3/0046* (2013.01); *B60L 11/1861* (2013.01);
(Continued)

(58) Field of Classification Search
CPC .............................. B01L 1/1868; B01L 1/1861
(Continued)

(56) References Cited

U.S. PATENT DOCUMENTS

| | | | | |
|---|---|---|---|---|
| 6,114,775 | A * | 9/2000 | Chung | B60K 6/46 180/65.245 |
| 6,608,482 | B2 * | 8/2003 | Sakai | B60K 6/445 320/132 |
| 6,741,065 | B1 * | 5/2004 | Ishii | B60L 11/1816 320/122 |
| 7,898,262 | B2 | 3/2011 | Kubo et al. | |

(Continued)

FOREIGN PATENT DOCUMENTS

| JP | 2005-127202 A | 5/2005 |
|---|---|---|
| JP | 2011-17546 A | 1/2011 |

(Continued)

OTHER PUBLICATIONS

Extended European Search Report dated Aug. 29, 2016 in Patent Application No. 16176612.6.

*Primary Examiner* — Yalkew Fantu
(74) *Attorney, Agent, or Firm* — Oblon, McClelland, Maier & Neustadt, L.L.P.

(57) ABSTRACT

According to some embodiments, a battery control device has a current detector, a storage, and a state determiner. The current detector detects a current value of a current which flows into a second battery which is connected in parallel to a first battery. The first battery and the second battery are charged with a fixed current. The storage stores an initial value of the current which flows into the second battery if the second battery is charged with the fixed current in an initial use stage of the second battery. The state determiner determines a state of the first battery based on the current value detected by the current detector and the initial value stored in the storage.

7 Claims, 8 Drawing Sheets

(51) Int. Cl.
*B60L 3/00* (2006.01)
*H01M 10/44* (2006.01)
*H01M 10/48* (2006.01)
*H01M 16/00* (2006.01)
*H01M 10/0525* (2010.01)
*H01M 10/06* (2006.01)
*H01M 12/00* (2006.01)

(52) U.S. Cl.
CPC ....... *H01M 10/441* (2013.01); *H01M 10/482* (2013.01); *H01M 16/00* (2013.01); *H01M 10/0525* (2013.01); *H01M 10/06* (2013.01); *H01M 12/00* (2013.01); *H01M 2220/20* (2013.01); *Y02E 60/122* (2013.01); *Y02E 60/126* (2013.01)

(58) Field of Classification Search
USPC .......................................... 320/109
See application file for complete search history.

(56) References Cited

U.S. PATENT DOCUMENTS

| | | |
|---|---|---|
| 2005/0088148 A1 | 4/2005 | Kubo et al. |
| 2010/0228413 A1* | 9/2010 | Fujitake ................ B60L 11/14 |
| | | 701/22 |
| 2013/0241480 A1* | 9/2013 | Kirimoto ............ B60L 11/1866 |
| | | 320/109 |
| 2014/0184159 A1 | 7/2014 | Kachi |
| 2015/0293180 A1 | 10/2015 | Dulle |
| 2015/0301115 A1* | 10/2015 | Ohkawa ................ H02J 7/0077 |
| | | 324/429 |

FOREIGN PATENT DOCUMENTS

| | | |
|---|---|---|
| JP | 2011-99762 A | 5/2011 |
| JP | 2012-88097 A | 5/2012 |
| JP | 2014-6099 | 1/2014 |
| JP | 2015-162914 A | 9/2015 |

* cited by examiner

BATTERY CONTROL DEVICE, BATTERY SYSTEM, AND MOVABLE BODY

CROSS-REFERENCE TO RELATED APPLICATIONS

This application is based upon and claims the benefit of priority from Japanese Patent Application No. 2015-235925, filed Dec. 2, 2015; the entire contents of which are incorporated herein by reference.

FIELD

Embodiments described herein relate generally to a battery control device, a battery system, and a movable body.

BACKGROUND

Conventionally, two or more storage batteries, such as a lead storage battery and a lithium ion storage battery, may be used together in a battery system mounted on a movable body, such as a vehicle, a vessel, an airplane, and so on. If these storage batteries are deteriorated by long-term use, electromotive force is reduced and output is reduced. For this reason, it is necessary to determine deterioration degree of these storage batteries and to replace a storage battery which has reached an end of lifetime (assumed usable period).

Although a technology of detecting characteristics (voltage, current, impedance, or the like) of a storage battery and determining deterioration of the storage battery based on the detected value is known, there is a ease that cost of a battery system is increased by preparing a detector which detects characteristics of a storage battery in both of the lead storage battery and the lithium ion storage battery.

DETAILED DESCRIPTION

According to some embodiments, a battery control device has a current detector, a storage, and a state determiner. The current detector detects a current value of a current which flows into a second battery which is connected in parallel to a first battery. The first battery and the second battery are charged with a fixed current. The storage stores an initial value of the current which flows into the second battery if the second battery is charged with the fixed current in an initial use stage of the second battery. The state determiner determines a state of the first battery based on the current value detected by the current detector and the initial value stored in the storage.

Hereinafter, a battery control device, a battery system, and a movable body of embodiments will be described with reference to drawings.

First Embodiment

Figure 1:
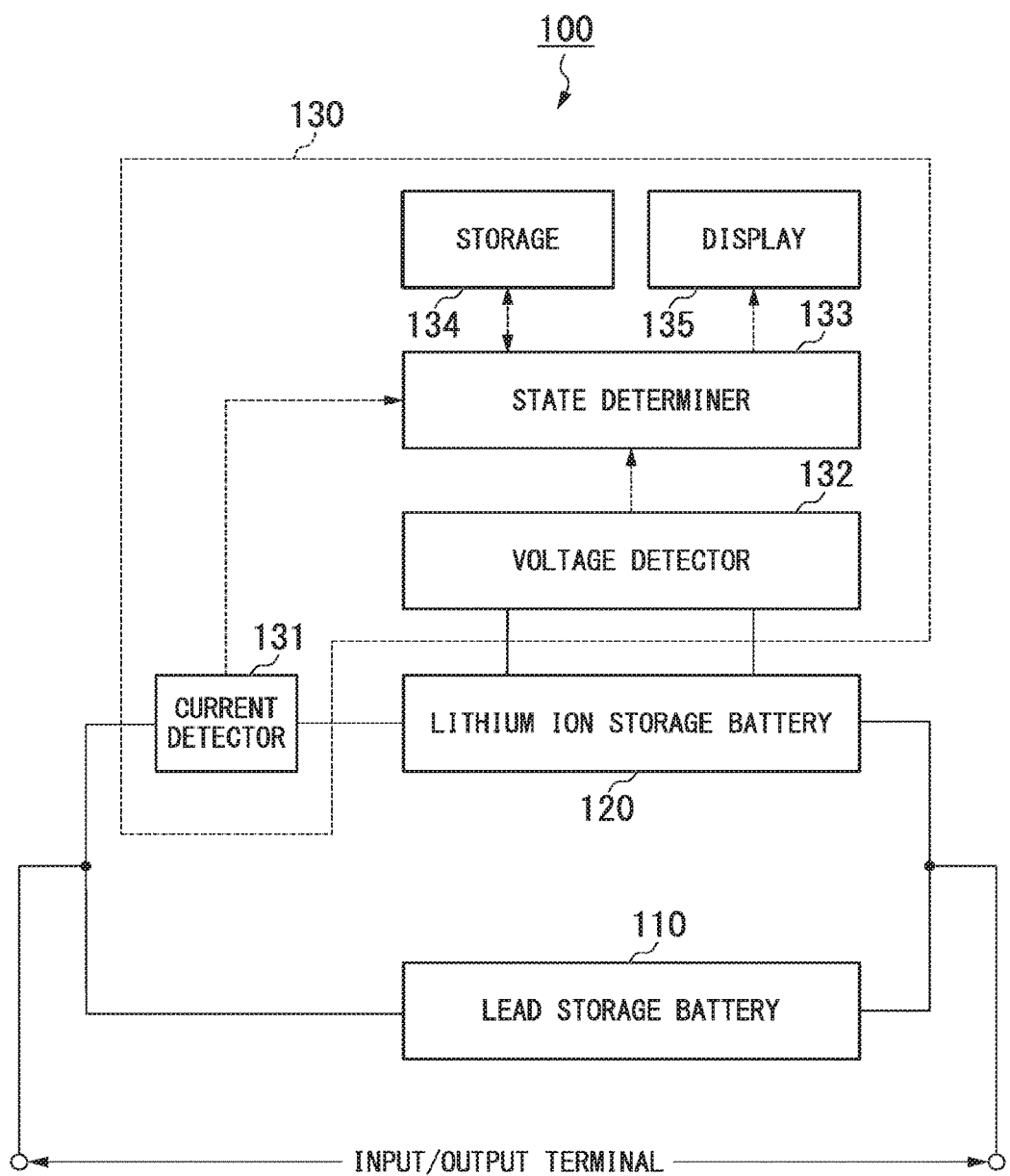
FIG. 1 is a drawing illustrating a battery system 100 in the first embodiment.

FIG. 1 is a drawing illustrating a battery system 100 in the first embodiment. For example, the battery system 100 is a system which supplies electric power to a movable body, such as a vehicle, a vessel, an airplane, and so on. The battery system 100 is equipped with a lead storage battery 110 (first battery), a lithium ion storage battery 120 (second battery), and a battery control device 130.

For example, the lead storage battery 110 is a battery of total 24 [V] in which twelve cells of 2 [V] are serially connected to each other. A number of the lead storage battery 110 may not be restricted to one, and two or more lead storage batteries 110 may be connected serially. For example, the lithium ion storage battery 120 is a battery of total 24 [V] in which twelve cells of 2 [V] are serially connected to each other. A number of the lithium ion storage battery 120 may not be restricted to one, and two or more lithium ion storage batteries 120 may be connected serially.

Although the lithium ion storage battery 120 is longer in lifetime (assumed usable period) than the lead storage battery 110 and the lithium ion storage battery 120 has more in power storage amount than the lead storage battery 110, output of the lithium ion storage battery 120 is reduced in low-temperature environment. For this reason, the lithium ion storage battery 120 is connected in parallel with the lead storage battery 110 which has advantageous output in low-temperature, and used.

The battery control device 130 is equipped with a current detector 131, a voltage detector 132, a state determiner 133, a storage 134, and a display (output device) 135. The current detector 131 detects a current which flows into the lithium ion storage battery 120, and outputs data of the detected current to the state determiner 133. The voltage detector 132 detects a voltage of the lithium ion storage battery 120, and outputs data of the detected voltage to the state determiner 133.

The state determiner 133 is implemented by a processor, such as a CPU (Central Processing Unit), which executes a program stored in the storage 134. The state determiner 133 may be implemented by hardware, such as an LSI (Large Scale Integration) and an ASIC (Application Specific Integrated Circuit), which has the same function as the processor executing the program. Although details will be described later, the state determiner 133 determines a state (lifetime) of the lead storage battery 110.

The storage 134 is a memory used by the state determiner 133. For example, the storage 134 is implemented by a ROM (Read Only Memory), a RAM (Random Access Memory), a HDD (Hard Disk Drive), a flash memory, or the like. For example, the display 135 is a display equipped with a liquid crystal panel, and outputs information based on the determination result by the state determiner 133.

Figure 2:
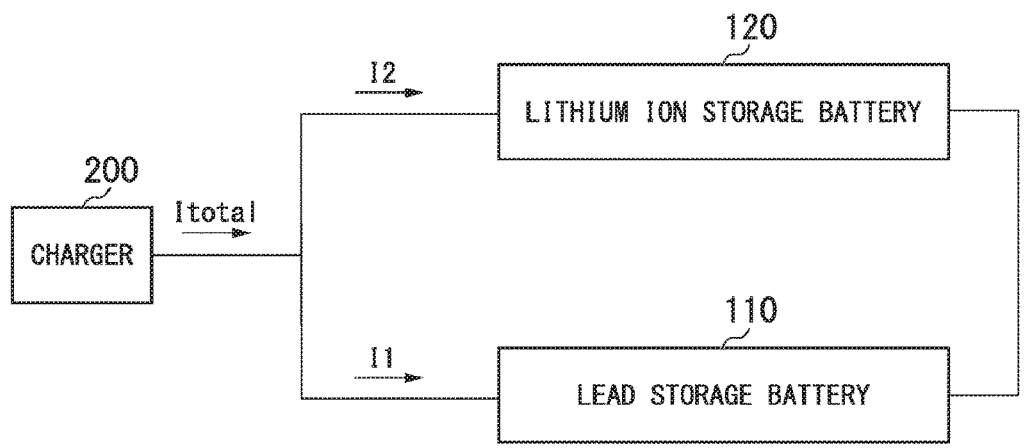
FIG. 2 is a drawing illustrating a charge operation by the charger 200.

FIG. 2 is a drawing illustrating a charge operation by the charger 200. The charger 200 charges the lead storage battery 110 and the lithium ion storage battery 120 by supplying electric power to the lead storage battery 110 and the lithium ion storage battery 120. The charger 200 charges the lead storage battery 110 and the lithium ion storage battery 120 with a fixed current value Itotal. For example, the charger 200 may include a power generator which generates electric power by using power from a power source. When the charger 200 charges, a current of a current value I1 flows into the lead storage battery 110, and a current of a current value I2 flows into the lithium ion storage battery 120.

Figure 3:
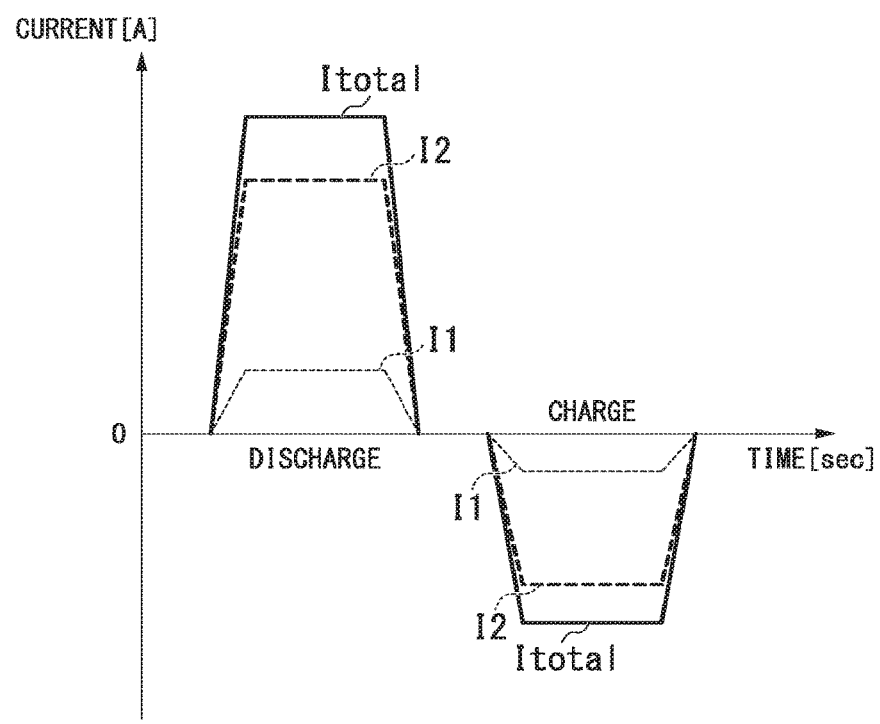
FIG. 3 is a drawing illustrating the current value I1 and the current value I2 in an initial use stage of the lead storage battery 110 and the lithium ion storage battery 120.
Figure 4:
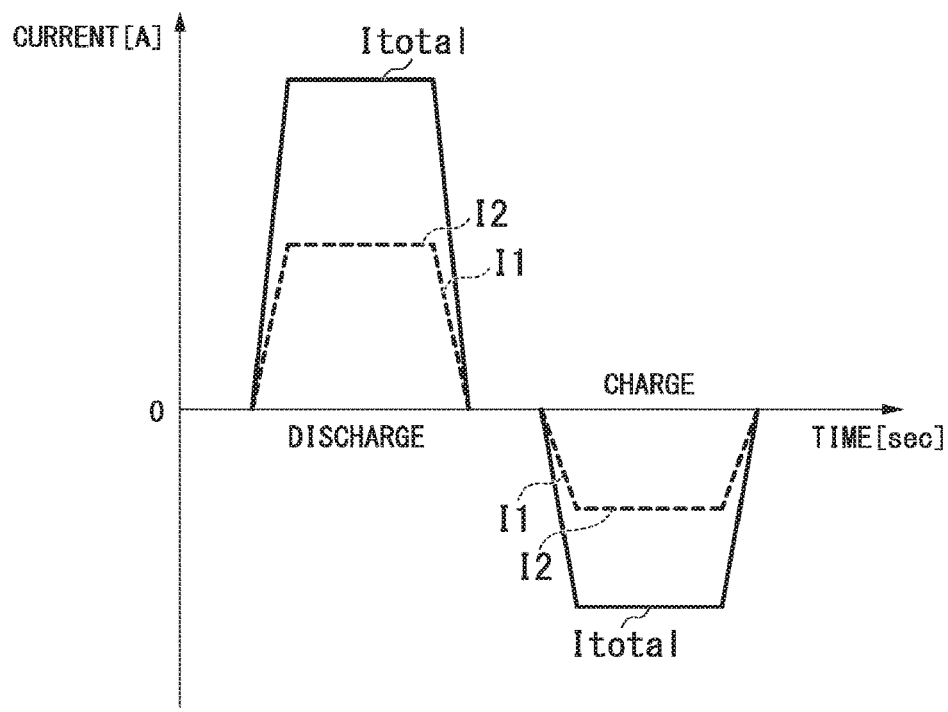
FIG. 4 is a drawing illustrating the current value I1 and the current value I2 at a time of end of lifetime of the lead storage battery 110.

FIG. 3 is a drawing illustrating the current value I1 and the current value I2 in an initial use stage of the lead storage battery 110 and the lithium ion storage battery 120. The initial use stage may be a stage where a manufacturer conducts an examination before shipment, or may be within a fixed period after shipping and starting an operation. FIG. 4 is a drawing illustrating the current value I1 and the current value I2 at a time of end of lifetime of the lead storage battery 110. In an initial use stage of the lithium ion storage battery 120, the storage 134 has stored an initial value Ist of a current which flows into the lithium ion storage battery 120 when the charger 200 charges with the fixed current value Itotal. As shown in FIG. 3, in the initial use stage of the lead storage battery 110 and the lithium ion storage battery 120, the current value I2 (the initial value Ist) of a current which flows into the lithium ion storage battery 120 is larger than the current value I1 of a current which flows into the lead storage battery 110.

However, caused by long-term use, the current value I2 of the current which flows into the lithium ion storage battery 120 becomes smaller gradually, and the current value I1 of the current which flows into the lead storage battery 110 becomes larger gradually. This is because the lithium ion storage battery 120 is higher in increasing rate of resistance than the lead storage battery 110. If the current value I1 of the current which flows into the lead storage battery 110 becomes larger, the voltage of the lead storage battery 110 in the end of charge becomes higher. For this reason, deterioration of the lead storage battery 110 proceeds quickly, and the lead storage battery 110 reaches the end of lifetime. Therefore, if the lead storage battery 110 reaches the end of lifetime, as shown in FIG. 4, the current value I1 becomes almost equal to the current value I2.

Figure 5:
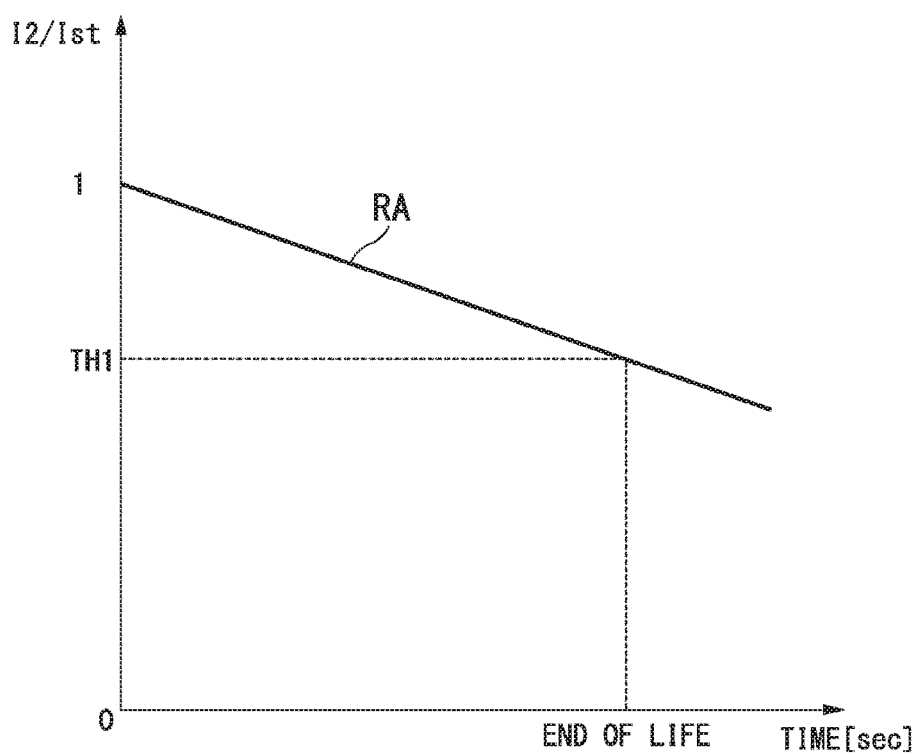
FIG. 5 is a drawing illustrating a change with time of a ratio RA between the current value I2 detected by the current detector 131 and the initial value Ist of the current value I2.

FIG. 5 is a drawing illustrating a change with time of a ratio RA between the current value I2 detected by the current detector 131 and the initial value Ist of the current value I2. As shown in FIG. 5, the ratio RA (=I2/Ist) between the current value I2 and the initial value Ist of the current value I2 becomes smaller gradually from 1. This is because, as described above, the current value I2 of the current which flows into the lithium ion storage battery 120 becomes smaller gradually, caused by long-term use.

Then, the state determiner 133 determines a state (lifetime) of the lead storage battery 110 based on the ratio RA between the current value I2 detected by the current detector 131 and the initial value Ist stored in the storage 134. Specifically, the state determiner 133 calculates the ratio RA by dividing the current value I2 by the initial value Ist. If the calculated ratio RA is decreased to a first threshold value TH1, the state determiner 133 determines that the lead storage battery 110 has reached the end of lifetime. In this embodiment, TH1 is set to 0.667. That is, if the current value I2 is decreased to about ⅔ (0.667) of the initial value Ist, the state determiner 133 determines that the lead storage battery 110 has reached the end of lifetime.

Figure 6:
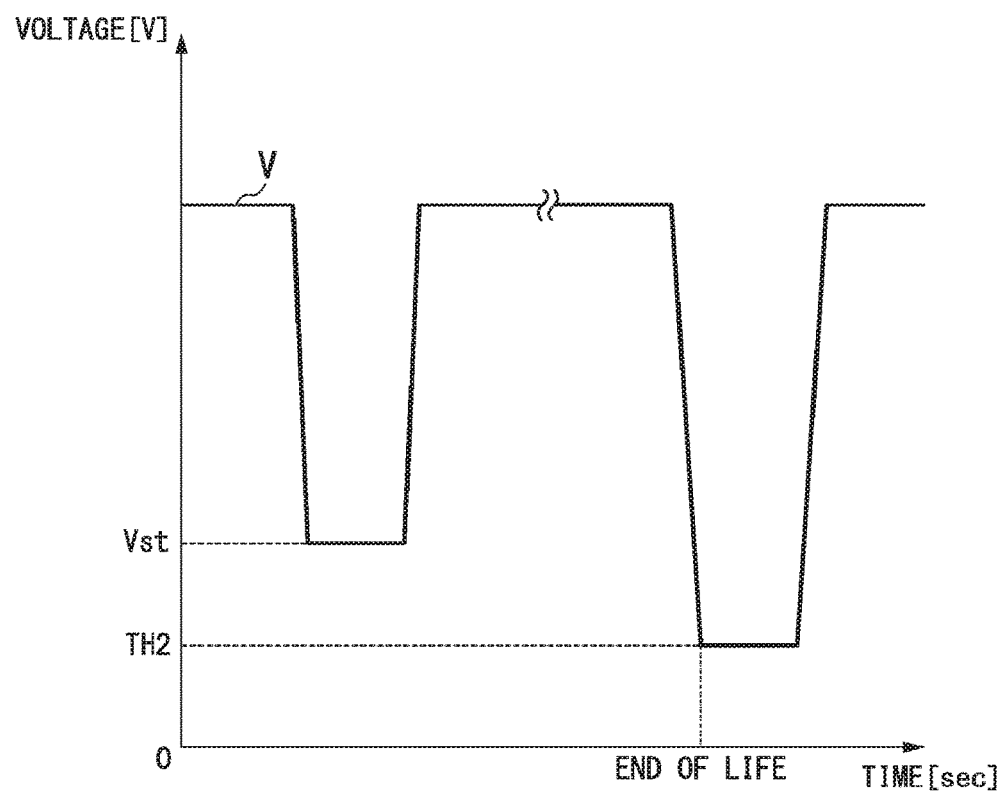
FIG. 6 is a drawing illustrating a change with time of the voltage value V detected by the voltage detector 132.

FIG. 6 is a drawing illustrating a change with time of the voltage value V detected by the voltage detector 132. As shown in FIG. 6, in an initial use stage of the lithium ion storage battery 120, if the lithium ion storage battery 120 is discharged, the voltage of the lithium ion storage battery 120 is decreased to Vst. However, caused by long-term use, power storage amount of the lithium ion storage battery 120 is decreased. For this reason, the voltage value V at a time of discharging the lithium ion storage battery 120 is decreased with long-term use.

Then, at a time of discharging the lithium ion storage battery 120, the state determiner 133 determines a state (lifetime) of the lithium ion storage battery 120 based on the voltage value V detected by the voltage detector 132. Specifically, for example, if the voltage value V when a discharge current of the lithium ion storage battery 120 is equal to or more than 50 [A] is decreased to a second threshold value TH2, the state determiner 133 determines that the lithium ion storage battery 120 has reached the end of lifetime. In this embodiment, TH2 is set to 14 [V]. That is, if the voltage value V at a time of discharging is decreased to 14 [V], the state determiner 133 determines that the lithium ion storage battery 120 has reached the end of lifetime.

Figure 7:
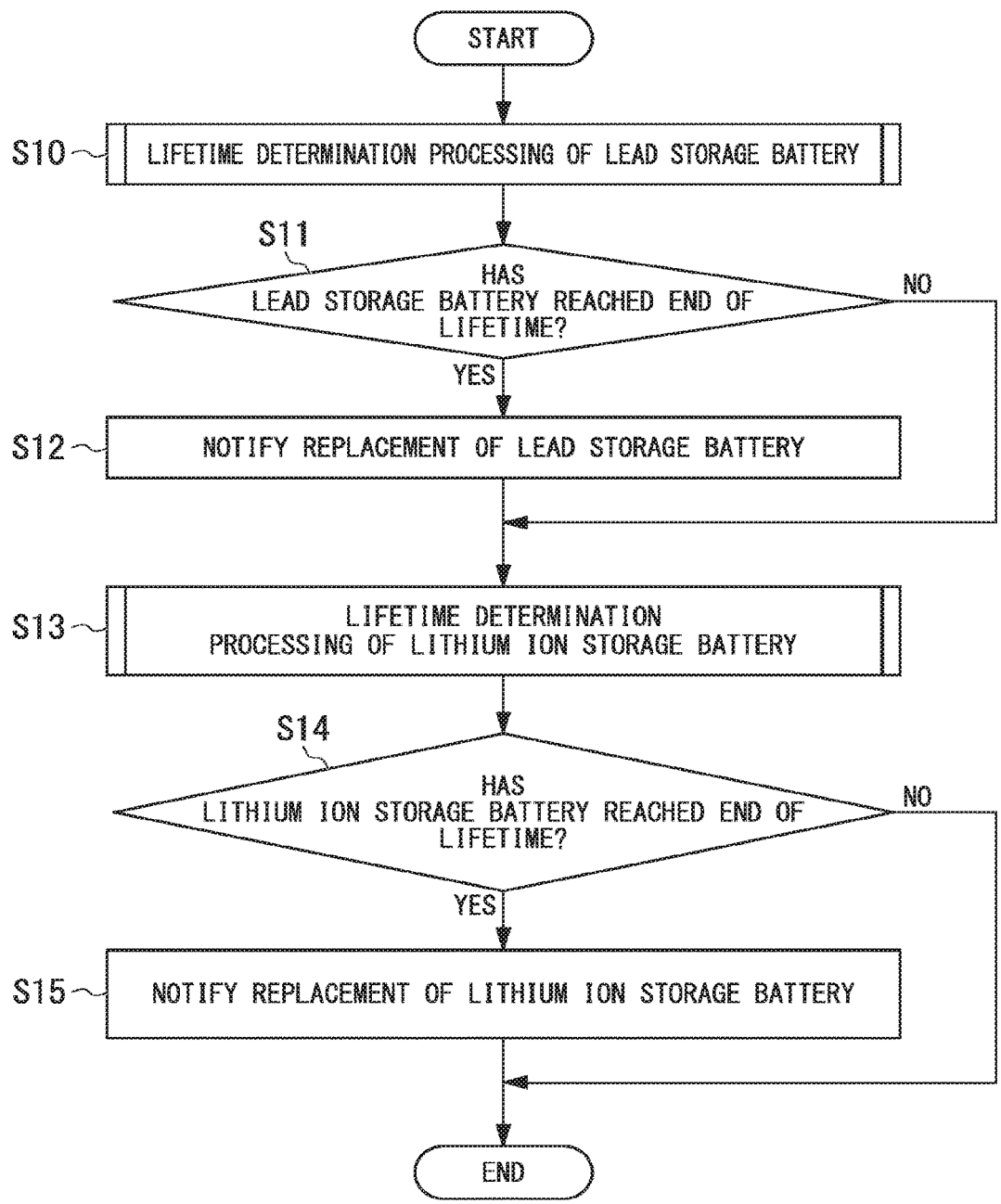
FIG. 7 is a flow chart illustrating a state determination operation of the lead storage battery 110 and the lithium ion storage battery 120.

FIG. 7 is a flow chart illustrating a state determination operation of the lead storage battery 110 and the lithium ion storage battery 120. This flow chart is executed by the state determiner 133 every time when a fixed time has passed.

The state determiner 133 executes a lifetime determination processing of the lead storage battery 110, which will be described later by using FIG. 8 (Step S10). Next, the state determiner 133 determines whether the lead storage battery 110 has reached the end of lifetime or not (Step S11).

If the state determiner 133 determines that the lead storage battery 110 has reached the end of lifetime, the state determiner 133 notifies replacement of the lead storage battery 110 by using the display 135 (Step S12). For example, the state determiner 133 displays information for urging replacement of the lead storage battery 110 on the display 135. The notification of replacement of the lead storage battery 110 is not restricted thereto, but may be a notification with a sound.

If the state determiner 133 has determined that the lead storage battery 110 has not reached the end of lifetime in Step S11, or if the notification of the replacement of Step S12 is performed, the state determiner 133 executes a lifetime determination processing of the lithium ion storage battery 120, which will be described later by using FIG. 9 (Step S13). Next, the state determiner 133 determines whether the lithium ion storage battery 120 has reached the end of lifetime or not (Step S14).

If the state determiner 133 has determined that the lithium ion storage battery 120 has reached the end of lifetime, the state determiner 133 notifies replacement of the lithium ion storage battery 120 by using the display 135 (Step S15). For example, the state determiner 133 displays information for urging replacement of the lithium ion storage battery 120 on the display 135. The notification of replacement of the lithium ion storage battery 120 is not restricted thereto, but may be a notification with a sound, a notification by a number of lighting lamps, or a notification by blink of a lamp.

If the state determiner 133 has determined that the lithium ion storage battery 120 has not reached the end of lifetime in Step S14, or if the notification of the replacement of Step S15 is performed, the state determiner 133 ends the processing of this flow chart.

Figure 8:
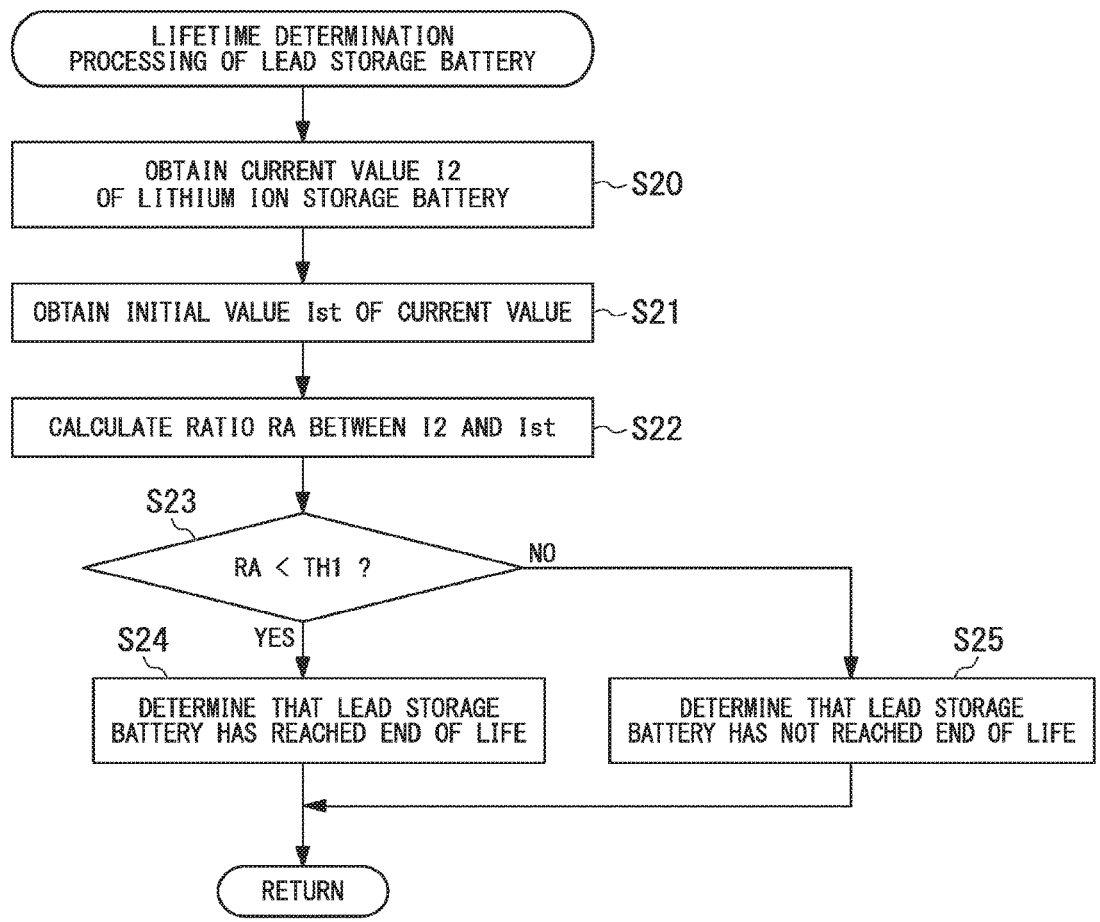
FIG. 8 is a flow chart illustrating a lifetime determination processing of the lead storage battery 110.

FIG. 8 is a flow chart illustrating a lifetime determination processing of the lead storage battery 110. This flow chart is a drawing illustrating Step S10 of FIG. 7 specifically. The state determiner 133 obtains the current value I2 of the lithium ion storage battery 120 from the current detector 131 (Step S20). Next, the state determiner 133 obtains the initial value Ist of the current value of the lithium ion storage battery 120 from the storage 134 (Step S21).

Thereafter, the state determiner 133 calculates the ratio RA based on the current value I2 and the initial value Ist (Step S22). Specifically, the state determiner 133 calculates the ratio RA by dividing the current value I2 by the initial value Ist.

The state determiner 133 determines whether the calculated ratio RA is less than the first threshold value TH1 or not (Step S23). If the state determiner 133 determines that the calculated ratio RA is less than the first threshold value TH1, the state determiner 133 determines that the lead storage battery 110 has reached the end of lifetime (Step S24), and proceeds to the processing of Step S11 of FIG. 7. On the other hand, if the state determiner 133 determines that the calculated ratio RA is not less than the first threshold value TH1, the state determiner 133 determines that the lead storage battery 110 has not reached the end of lifetime (Step S25), and proceeds to the processing of Step S11 of FIG. 7.

Figure 9:
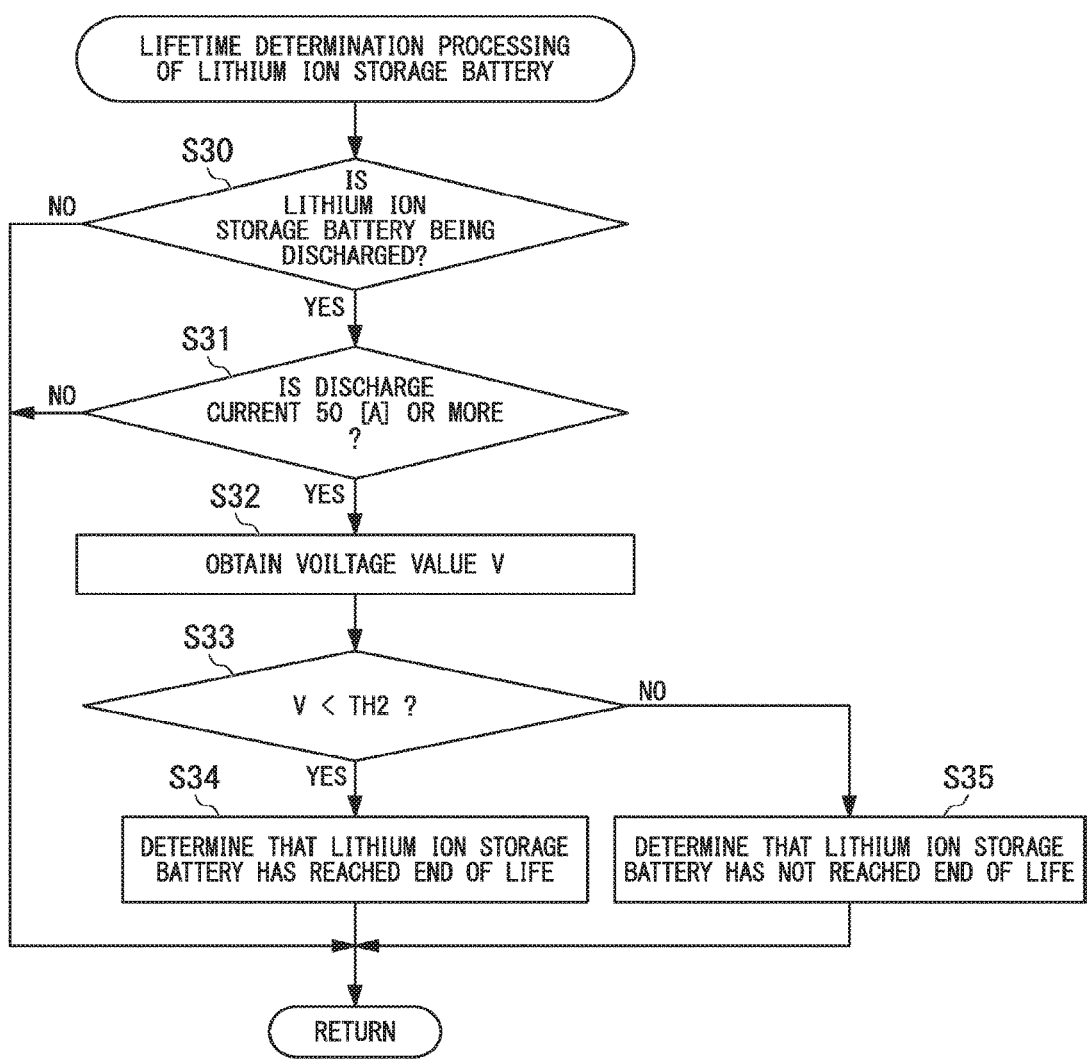
FIG. 9 is a flow chart illustrating a lifetime determination processing of the lithium ion storage battery 120.

FIG. 9 is a flow chart illustrating a lifetime determination processing of the lithium ion storage battery 120. This flow chart is a drawing illustrating Step S13 of FIG. 7 specifically. The state determiner 133 determines whether the lithium ion storage battery 120 is being discharged or not (Step S30). If the state determiner 133 determines that the lithium ion storage battery 120 is not being discharged, the state determiner 133 proceeds to the processing of Step S14 of FIG. 7 because the state determiner 133 cannot determine the lifetime of the lithium ion storage battery 120.

On the other hand, if the state determiner 133 determines that the lithium ion storage battery 120 is being discharged, the state determiner 133 determines whether or not the discharge current of the lithium ion storage battery 120 is equal to or more than 50 [A] (Step S31). If the state determiner 133 determines that the discharge current of the lithium ion storage battery 120 is less than 50 [A], the state determiner 133 proceeds to the processing of Step S14 of FIG. 7. On the other hand, the state determiner 133 determines that the discharge current of the lithium ion storage battery 120 is equal to or more than 50 [A], the state determiner 133 obtains the voltage value V from the voltage detector 132 (Step S32). Next, the state determiner 133 determines whether the voltage value V is less than the second threshold value TH2 or not (Step S33).

If the state determiner 133 determines that the voltage value V is less than the second threshold value TH2, the state determiner 133 determines that the lithium ion storage battery 120 has reached the end of lifetime (Step S34), and proceeds to the processing of Step S14 of FIG. 7. On the other hand, if the state determiner 133 determines that the voltage value V is not less than the second threshold value TH2, the state determiner 133 determines that the lithium ion storage battery 120 has not reached the end of lifetime (Step S35), and proceeds to the processing of Step S14 of FIG. 7.

As described above, in the first embodiment, the state determiner 133 determines a state of the lead storage battery 110 based on the current value I2 detected by the current detector 131 and the initial value Ist stored in the storage 134. Thereby, deterioration degree of two or more storage batteries can be determined at low cost.

In this embodiment, if the voltage value V becomes less than the second threshold value TH2, the state determiner 133 determines that the lithium ion storage battery 120 has been reached the end of lifetime. However, the lifetime determination method of the lithium ion storage battery 120 is not restricted thereto. For example, if the voltage value V becomes less than the second threshold value TH2 for a first predetermined number of times (for example, 1 time), the state determiner 133 may turn on a yellow lamp of the display 135, which represents that the end of lifetime of the lithium ion storage battery 120 is close. Moreover, if the voltage value V becomes less than the second threshold value TH2 for a second predetermined number of times (for example, 10 times) which is more than the first predetermined number of times, the state determiner 133 may turn on a red lamp of the display 135, which represents that the lithium ion storage battery 120 has reached the end of lifetime.

Second Embodiment

The second embodiment applies the battery system 100 described in the first embodiment to a vehicle 1 which is equipped with an ISS (Idling Stop System). Hereinafter, the vehicle 1 of the second embodiment will be described in detail.

Figure 10:
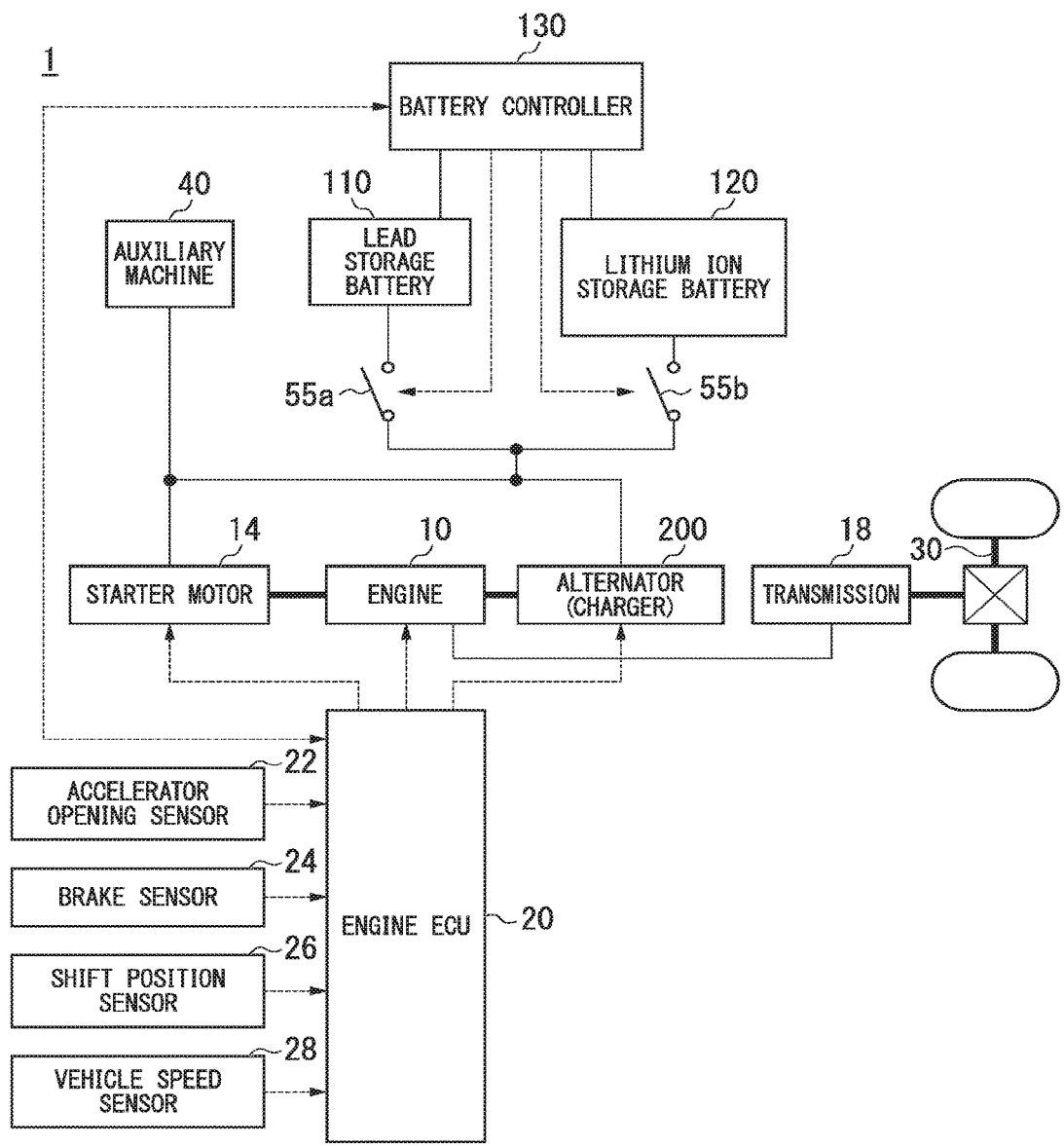
FIG. 10 is a drawing illustrating an example of functional configuration of the vehicle 1 in the second embodiment, in which the battery system 100 is mounted.

FIG. 10 is a drawing illustrating an example of functional configuration of the vehicle 1 in the second embodiment, in which the battery system 100 is mounted. For example, the vehicle 1 is equipped with an engine 10, a starter motor 14, a transmission 18, an engine ECU (Electronic Control Unit) 20, an accelerator opening sensor 22, a brake sensor 24, a shift position sensor 26, a vehicle speed sensor 28, an axle 30, an auxiliary machine 40, switches 55a and 55b, a lead storage battery 110, a lithium ion storage battery 120, a battery control device 130, and an alternator (charger) 200.

The engine 10 outputs power by burning hydrocarbon fuel, such as gasoline, inside the engine 10. The power which is output by the engine 10 is output to the axle 30 through the transmission 18, a clutch (not illustrated), and a deferential gear (not illustrated). The alternator 200 generates electric power by using the power output by the engine 10, and generates (regenerates) electric power by using the power input from the axle 30 at a time of decreasing a speed of the vehicle 1. The alternator 200 corresponds to the charger 200 in the first embodiment. The electric power generated by the alternator 200 is used for charging the lead storage battery 110 and the lithium ion storage battery 120. The starter motor 14 is driven by the engine ECU 20 in a state where the engine 10 has stopped, and the starter motor 14 performs clanking operation and starts the engine 10. The starter motor 14 may have a function of outputting driving force for running at a time of starting or accelerating the vehicle 1. In this case, the starter motor 14 can also generate electric power by regeneration at a time of braking the vehicle 1.

In addition, input/output axes of the engine 10, the alternator 200, and the starter motor 14 may be connected directly or indirectly. Moreover, the order of the arrangement of the engine 10, the alternator 200, and the starter motor 14 shown in FIG. 10 does not restrict these connection forms.

The engine ECU 20 controls the engine 10, the alternator 200, and the starter motor 14 based on values input from the accelerator opening sensor 22, the brake sensor 24, the shift position sensor 26, the vehicle speed sensor 28, and so on. For example, the engine ECU 20 adjusts throttle opening of the engine 10 and adjusts ignition timing appropriately based on values input from the accelerator opening sensor 22, the shift position sensor 26, the vehicle speed sensor 28, and so on. Moreover, the engine ECU 20 controls ON/OFF of the alternator 200 based on a running state of the vehicle 1 and charging rates of the lead storage battery 110 and the lithium ion storage battery 120. For example, if the vehicle 1 accelerates, the engine ECU 20 controls the alternator 200 to be an OFF state. Otherwise, if the SOC (charging rate) of the lead storage battery 110 and the lithium ion storage battery 120, which has been input from the battery control device 130, is less than a predetermined lower limit, the engine ECU 20 controls the alternator 200 to be an ON state.

Moreover, for example, if both the value input from the vehicle speed sensor 28 and the value input from the accelerator opening sensor 22 are less than a minute value (a value which is considered as zero), and a value or a signal input from the brake sensor 24 represents that it is being braked, the engine ECU 20 performs a control (idling stop control) of stopping the engine 10.

The lead storage battery 110 is connected in parallel to the lithium ion storage battery 120. The lead storage battery 110 and the lithium ion storage battery 120 supply electric power to the starter motor 14, the engine ECU 20, various ECUs such as the battery control device 130, the auxiliary machine 40, and so on. Moreover, the switch 55a is prepared between the lead storage battery 110 and the alternator 200, and the switch 55b is prepared between the lithium ion storage battery 120 and the alternator 200. The switches 55a and 55b can connect or disconnect the lead storage battery 110 and the lithium ion storage battery 120 to the alternator 200 and the auxiliary machine 40.

For example, the battery control device 130 calculates the SOC of the lead storage battery 110 and the lithium ion storage battery 120, by integrating a charge/discharge current of the lead storage battery 110 and the lithium ion storage battery 120. The state determiner 133 prepared in the battery control device 130 performs the state determination operation (refer to FIG. 7) of the lead storage battery 110 and the lithium ion storage battery 120 shown in the first embodiment. Thereby, even if the lead storage battery 110 and the lithium ion storage battery 120 are mounted on the vehicle 1, deterioration degree of two or more storage batteries can be determined at low cost.

In addition, in the second embodiment, although the vehicle 1 has been described as an example of a movable body, it is not restricted thereto. For example, the battery system 100 of this embodiment may be mounted on a movable body, such as a vessel, an airplane, or the like.

According to at least one embodiment described above, the state determiner 133 determines the state of the lead storage battery 110 based on the current value I2 detected by the current detector 131 and the initial value Ist stored in the storage 134. Thereby, deterioration degree of two or more storage batteries can be determined at low cost.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A battery control device comprising:
    a current detector configured to detect a current value of a current which flows into a lithium ion storage battery which is connected in parallel to a lead storage battery, the lead storage battery and the lithium ion storage battery being chargeable with a fixed current;
    a storage which stores an initial value of the current which flows into the lithium ion storage battery when the lithium ion storage battery is charged with the fixed current in an initial use stage of the lithium ion storage battery; and
    a state determiner configured to
        calculate a ratio between the current value detected by the current detector and the initial value stored in the storage, and
        determine that the lead storage battery has reached an assumed usable period when the calculated ratio is decreased to a first threshold value,
    wherein, when the lead storage battery and the lithium ion storage battery are charged with the fixed current, the first threshold value is set based on a ratio between the current value of the current flowing into the lithium ion storage battery and the initial value when a current flowing into the lead storage battery becomes equal to the current flowing into the lithium ion storage battery.

2. The battery control device according to claim 1, further comprising:
    an output device configured to output information based on a determination result by the state determiner.

3. The battery control device according to claim 2,
    wherein the output device is configured to output information for urging replacement of the lead storage battery when the state determiner has determined that the lead storage battery has reached the assumed usable period.

4. The battery control device according to claim 2, further comprising:
    a voltage detector configured to detect a voltage value of the lithium ion storage battery,
    wherein the state determiner is configured to determine that the lithium ion storage battery has reached the assumed usable period when the voltage value detected by the voltage detector at a time of discharging the lithium ion storage battery has been decreased to a second threshold value.

5. The battery control device according to claim 4,
    wherein the output device is configured to output information for urging replacement of the lithium ion storage battery when the state determiner has determined that the lithium ion storage battery has reached the assumed usable period.

6. A battery system comprising:
    the lead storage battery;
    the lithium ion storage battery; and
    the battery control device according to claim 1.

7. A movable body comprising:
    the battery system according to claim 6;
    an engine configured to output power; and
    a charger configured to charge the lead storage battery and the lithium ion storage battery based on the power output of the engine.

* * * * *